UNITED STATES PATENT OFFICE.

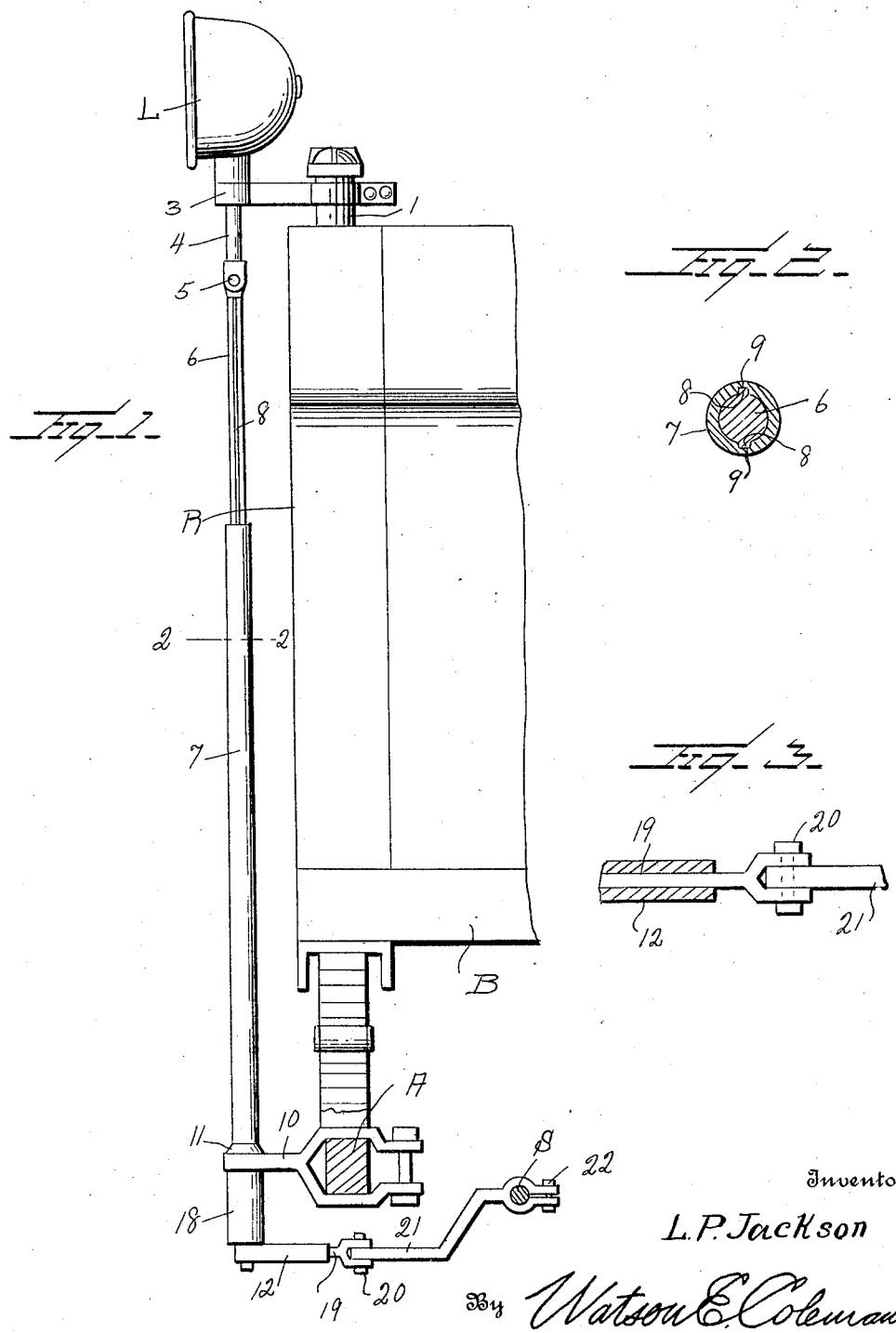

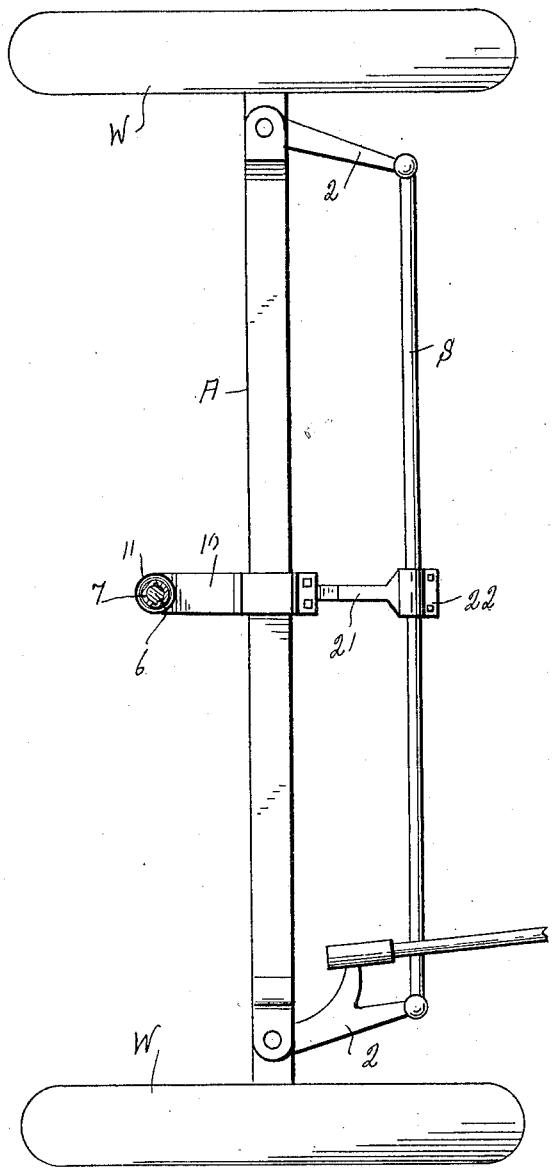
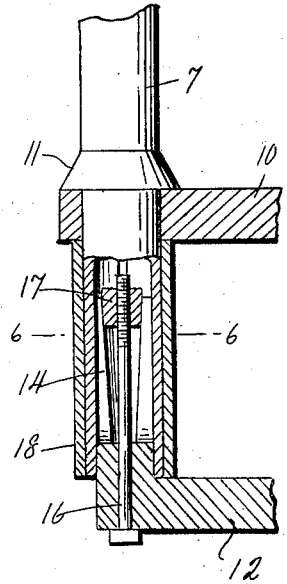
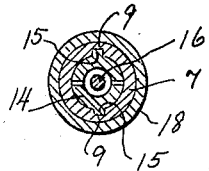

LESTER P. JACKSON, OF LORDSBURG, NEW MEXICO.

DIRIGIBLE HEADLIGHT.

1,362,703.   Specification of Letters Patent.   Patented Dec. 21, 1920.

Application filed April 14, 1919. Serial No. 289,944.

*To all whom it may concern:*

Be it known that I, LESTER P. JACKSON, a citizen of the United States, residing at Lordsburg, in the county of Grant and State of New Mexico, have invented certain new and useful Improvements in Dirigible Headlights, of which the following is a specification, reference being had to the accompanying drawings.

This invention relates to certain improvements in dirigible headlights, and it is an object of the invention to provide a device of this general character including novel and improved means whereby the headlight may be caused to turn in the same general direction as the steering wheels in effecting a change in the direction of travel so that the pathway in advance of a vehicle may be effectively illuminated.

It is also an object of the invention to provide a device of this general character having novel and improved means whereby the same is supported from the radiator or other part of a body of an automobile or the like and wherein requisite turning movement is imparted to the headlight through the instrumentality of the rod connecting the spindle arms of the steering wheels.

It is also an object of the invention to provide a device of this general character including novel and improved means for properly controlling the headlight and which means includes an operating member or post readily adjusted into or out of working arrangement.

The invention consists in the details of construction and in the combination and arrangement of the several parts of my improved dirigible headlight whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be better understood, I will now proceed to describe the same with reference to the accompanying drawings, wherein:

Figure 1 is a fragmentary view partly in side elevation and partly in section illustrating a dirigible headlight constructed in accordance with an embodiment of my invention.

Fig. 2 is a sectional view taken substantially on the line 2—2 of Fig. 1.

Fig. 3 is a fragmentary view partly in elevation and partly in section illustrating the arms coacting with the steering rod and the lower rotatable section coacting with the lamp.

Fig. 4 is a fragmentary view partly in top plan and partly in section of the mechanism as herein disclosed.

Fig. 5 is an enlarged fragmentary view partly in elevation and partly in section illustrating the detachable connection of the arm with the lower end portion of the lower rotatable section coacting with the light, and Fig. 6 is a sectional view taken substantially on the line 6—6 of Fig. 5.

As disclosed in the accompanying drawings, A denotes the front axle of an automobile or other vehicle and with which is operatively engaged the body B including a radiator R and which radiator, at substantially the transverse center of the body B, is provided with the upstanding filler neck 1. 2 denotes a rearwardly directed arm carried by the spindle of each of the steering wheels W, and S denotes a steering rod connecting both of the arms 2 for a well known purpose.

Clamped to the filler neck 1 is a forwardly directed arm 3 terminating in advance of the radiator R and rotatably supported by the outer extremity of said arm 3 is a spindle 4 depending from the spot or headlight L. Hingedly connected, as at 5, with the lower end portion of the spindle 4 is an elongated member 6 which telescopically engages within the elongated tubular member 7. The members 6 and 7 have relative longitudinal movement, but in order to connect the same for unitary rotation, the member 6 is provided with the longitudinally disposed ribs 8 extending within similarly formed grooves or channels 9 produced in the inner wall of the member 7.

Clamped to the axle A and substantially in vertical alinement with the arm 3 is a forwardly directed arm 10 through which the lower end portion of the member 7 is loosely directed and said member 7, at a point inwardly of but in close proximity to its lower end, is provided with an outstanding annular flange or collar 11 adapted to engage the upper surface of the arm 10 whereby said arm serves as a support for the member 7.

By having the members 6 and 7 telescopically engaged, provision is made for the vertical vibration of the body B incident to the travel of the vehicle and which is particularly pronounced when the vehicle is traveling over a rough roadway.

It will also be noted that when the members 6 and 7 are assembled, the lower member 7 is in a position to interfere with the cranking of the engine. By lifting the lower member 7 upwardly to free the same from the arm 10, the members 6 and 7 may be readily swung about the pivot 5 to a position whereby no obstruction or hindrance is offered to the cranking operation.

12 denotes a rearwardly directed arm coacting with the lower end of the section 7. The forward end portion of the arm 12 is provided with an upstanding split sleeve 14 extending within the lower end of the member 7. The sleeve 14 is also provided with longitudinally disposed outstanding ribs 15 extending within the grooves or channels 9 of the member 7, so that the arm 12 will be positively connected to the member 7.

Supported by the outer end portion of the arm 12 and extending through the sleeve 14 is a threaded shank 16 on which is mounted an expanding member 17. By rotating the shank 16 in one direction, the expanding member 17 will be drawn within the sleeve 14 and cause the same to effectively engage the member 7, while rotation of the shank 16 in the opposite direction permits the sleeve to contract so that, when desired, the member 7 may be readily disengaged from the arm 10 carried by the axle A. The friction between the sleeve 14 and the member 17 is greater than the friction between the shank 16 and the member 17, so that the desired movement of the member 17 along the shank 16 and with respect to the sleeve 14 is assured and particularly upon imposing downward pull or strain upon the shank 16. This downward pull or strain may be readily accomplished by the same gripping action on the head of the shank 16 which is employed to rotate said shank. It is to be noted that the bolt 16 is of a length to extend beyond the free end of the split sleeve 14 so that the nut 17 and bolt 16 may be readily engaged one with the other before the sleeve 14 is inserted within the lower end of the member 7.

Loosely surrounding the lower end portion of the member 7 and positioned between the arms 10 and 12 is a spacing sleeve 18. The arm 12 is telescopically engaged with a supplemental arm 19 and the outer end of said arm 19 is hingedly connected, as at 20, with an end portion of a forwardly directed arm 21 which is clamped or otherwise secured, as at 22, to the steering rod S so that during a steering operation, the members 6 and 7 will be caused to turn or swing the light L in unison with and in the same general direction as the steering wheels W so that the pathway in advance of the vehicle will be effectively illuminated when said vehicle is changing its course of travel.

From the foregoing description, it is thought to be obvious that a dirigible headlight constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A dirigible headlight mechanism for automobiles comprising, in combination with an axle, a body supported thereby, and a steering rod positioned adjacent the axle; a light carrying member rotatably supported by the body, an outstanding arm carried by the axle, a second member removably supported by the arm, both of said members having relative longitudinal movement and connected for unitary rotation, the lower end portion of the second named member being provided with a socket, an arm provided with an expansible sleeve insertible within the socket, means for expanding the sleeve to secure the same to the second named member, and an operative connection between the second named arm and the steering rod for imparting rotation to the members upon steering movement of the rod.

2. A dirigible headlight mechanism for automobiles comprising, in combination with an axle, a body supported thereby, and a steering rod positioned adjacent the axle; a light carrying member rotatably supported by the body, an outstanding arm carried by the axle, a second member removably supported by the arm, both of said members having relative longitudinal movement and connected for unitary rotation, the lower end portion of the second named member being provided with a socket, an arm provided with an expansible sleeve insertible within the socket, means for expanding the sleeve to secure the same to the second named member, and an operative connection between the second named arm and the steering rod for imparting rotation to the members upon steering movement of the rod, said second named member and the expansible sleeve being provided with coacting ribs and grooves.

In testimony whereof I hereunto affix my signature in the presence of two witnesses.

LESTER P. JACKSON.

Witnesses:
D. L. HILL,
B. A. GREGG.